United States Patent
Utsumi et al.

(10) Patent No.: US 8,259,262 B2
(45) Date of Patent: Sep. 4, 2012

(54) LIQUID CRYSTAL DISPLAY APPARATUS HAVING PARTICULAR POLARIZERS

(75) Inventors: Yuka Utsumi, Hitachi (JP); Ikuo Hiyama, Hitachinaka (JP); Katsumi Kondo, Mito (JP); Shigeru Matsuyama, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 535 days.

(21) Appl. No.: 12/539,666

(22) Filed: Aug. 12, 2009

(65) Prior Publication Data

US 2010/0066949 A1 Mar. 18, 2010

(30) Foreign Application Priority Data

Sep. 17, 2008 (JP) .................. 2008-237469

(51) Int. Cl.
G02F 1/1335 (2006.01)
G02F 1/1337 (2006.01)
(52) U.S. Cl. ................. 349/96; 349/99; 349/9; 349/130
(58) Field of Classification Search ............... 349/96, 349/99, 9, 130
See application file for complete search history.

(56) References Cited

U.S. PATENT DOCUMENTS

| 6,399,166 | B1 | 6/2002 | Khan et al. |
| 6,630,973 | B1* | 10/2003 | Matsuoka et al. ........... 349/117 |
| 6,891,589 | B2* | 5/2005 | Hata et al. .................. 349/117 |
| 7,176,999 | B2* | 2/2007 | Miyachi ..................... 349/118 |
| 2004/0146663 | A1 | 7/2004 | Paukshto et al. |
| 2005/0068480 | A1 | 3/2005 | Hiyama et al. |
| 2006/0268198 | A1* | 11/2006 | Utsumi et al. ............... 349/96 |

FOREIGN PATENT DOCUMENTS

| JP | 2006-518871 | 7/2004 |
| JP | 2005-128498 | 5/2005 |
| JP | 2006-330215 | 12/2006 |
| WO | WO 97/39380 | 10/1997 |

* cited by examiner

*Primary Examiner* — Mike Qi
(74) *Attorney, Agent, or Firm* — Antonelli, Terry, Stout & Kraus, LLP.

(57) ABSTRACT

Provided is a liquid crystal display apparatus including: a liquid crystal panel including a pair of substrates; a liquid crystal layer sandwiched by the pair of substrates; plural electrodes formed on at least one of the pair of substrates; and a pair of polarizers provided in respective outsides of the pair of substrates; and a back light unit provided in a rear of the liquid crystal panel, in which one of the pair of polarizers, which is provided at a side of the back light unit, includes at least two types of layers which cause polarization, and in which the two types of layers include a first layer provided on a side of the liquid crystal layer and a second layer provided on a side of the back light unit, the first layer being a negative uniaxial polarizer layer, the second layer being a positive uniaxial polarizer layer.

5 Claims, 6 Drawing Sheets

LIQUID CRYSTAL DISPLAY APPARATUS HAVING PARTICULAR POLARIZERS

CROSS-REFERENCE TO RELATED APPLICATION

The present application claims priority from Japanese application JP 2008-237469 filed on Sep. 17, 2008, the content of which is hereby incorporated by reference into this application.

BACKGROUND OF THE INVENTION

1. Field of the Invention

The present invention relates to a liquid crystal display apparatus including a liquid crystal panel using a polarizer layer with improved viewing angle characteristics.

2. Description of the Related Art

A cathode ray tube (CRT, also generally referred to as "Braun tube") has been a mainstream of display devices, but liquid crystal displays have the benefit of being less thick and more lightweight than CRTs. Further, with the advance of the technology for improving image quality of the liquid crystal displays, the use and market for the liquid crystal displays have been expanding.

Recently, the liquid crystal displays have been used in monitors for desktop personal computers, monitors for printing or designing, or the like. Demands have been increasing to provide better color reproducibility and higher contrast ratio with broadening applications as liquid crystal televisions. In particular, the viewing angle characteristics in contrast ratio are very important in the liquid crystal televisions which become increasingly popular along with digital broadcasting and high-definition broadcasting. With respect to the viewing angle characteristics, not only a specific angle in a case where the liquid crystal display is viewed in an oblique direction is taken into account. For example, when a normal liquid crystal television set having an aspect ratio (length-to-width) of 9:16 is observed at a distance of 3H (three times of a screen longitudinal length) recommended for high-definition broadcasting reception, an observer observes display information with an angle of at least 33 degrees (plus/minus 16.5 degrees in lateral direction).

When an observer does not watch the display in a center direction, an asymmetrically larger angle can come into view. When the display information is observed by the observer at a distance of 2H to obtain more realism, the screen is viewed at a viewing angle of 48 degrees. That is, when a contrast ratio is remarkably changed depending on the viewing angle, the observer views the screen with significantly different image qualities. Therefore, it is likely to cause not only uncomfortable feeling about the screen but also eyestrain.

The viewing angle characteristics of the liquid crystal display apparatuses depend on the viewing angle characteristics of polarizers including a stretched component of iodine or a dichroic dye, and the viewing angle characteristics of liquid crystal layers. In order to improve the viewing angle characteristics, an optical film exhibiting a phase difference is generally used. For example, JP 2005-128498 discloses a horizontal electric field mode liquid crystal display apparatus using a retarder film.

Two polarizers obtained by dyeing polyvinyl alcohol with iodine and then stretching the dyed polyvinyl alcohol are used for a normal liquid crystal display apparatus. The degree of polarization of a stretched polarizer is sufficiently high. For example, in many cases, a contrast ratio of the polarizers (the contrast ratio is obtained by dividing brightness in case where a pair of polarizers are arranged to have polarized axes parallel to each other into brightness in case where the two polarizers are arranged to have polarized axes orthogonal to each other) is equal to or larger than 10,000.

However, a contrast ratio of the liquid crystal display apparatus using the two polarizers, which is observed by observers, is as low as approximately 1/10 of the contrast ratio of the polarizers. This is because a member which converts incident polarized light into light having an undesirable polarized state or a partial depolarization state is located in a liquid crystal panel provided between the pair of polarizers.

An iodine stretched polarizer which is normally used has extremely low polarizance to light incident from an oblique direction. In the liquid crystal display apparatus, light from a back light is incident on the liquid crystal panel from substantially all directions including a polar angle and an azimuthal angle. The characteristic in which the degree of polarization of the polarizer in the oblique direction is low causes a large reduction in contrast ratio in the oblique direction. As a result, the contrast ratio of the liquid crystal display apparatus in the oblique direction reduces to as low as approximately 10.

According to JP 2005-128498 A, means for improving a viewing angle characteristic with respect to a contrast ratio using a retarder film, that is, means for reducing light leakage in the oblique direction during a black state is disclosed. The retarder film changes a phase of incident polarized light because of the birefringence, but a refractive index value largely depends on a wavelength. For example, when a design value capable of compensation of viewing angle characteristics at a wavelength of 550 nm (green) is used, complete compensation cannot be achieved in wavelength regions corresponding to blue (equal to or larger than 430 nm and equal to or smaller than 480 nm) and red (equal to or larger than 600 nm and equal to or smaller than 700 nm), which are wavelengths separate from the wavelength of 550 nm, thereby causing light leakage. Therefore, cyan or magenta tint occurs. This degrades image quality in a black state.

SUMMARY OF THE INVENTION

An object of the present invention is to provide a liquid crystal display apparatus in which viewing angle characteristics of a polarizer are improved, that is, light leakage in an oblique direction during a black state is reduced.

In order to achieve the object described above, according to the present invention, the liquid crystal display apparatus employs a structure using at least one polarizer including a combined polarizer film. The combined polarizer film includes a polarizer layer which is positive uniaxial and a polarizer layer which is negative uniaxial.

In the polarizer layer which is positive uniaxial, molecules in which an extraordinary refractive index in which an electric field of light is parallel to a long axis of a molecule is larger than an ordinary refractive index in which the electric field of light is perpendicular to the long axis of the molecule, are aligned (oriented) in one direction. The polarizer layer which is positive uniaxial includes dichroic molecules with a molecular absorption axis substantially parallel to the long axis of the molecule. In the polarizer layer which is negative uniaxial, molecules in which the extraordinary refractive index is smaller than the ordinary refractive index are aligned in one direction. The polarizer layer which is negative uniaxial includes molecules with a molecular absorption axis lateral to a long axis of a molecule or at an angle close to perpendicular thereto.

P-polarized light having an oscillation plane (electric field vector) within an incident plane corresponds to the extraordinary refractive index. S-polarized light having an oscillation plane (electric field vector) perpendicular to the incident plane corresponds to the ordinary refractive index. The S-polarized light distorts an electron cloud in a direction perpendicular to the long axis of the molecule without depending on an incident angle, and hence polarization characteristics do not depend on the incident angle. On the other hand, the P-polarized light strongly depends on the angle of incident light. The reason for this is as follows. In a case of vertical incidence, the electric field of light is parallel to the long axis of the molecule, and hence a refractive index of the P-polarized light corresponds to the extraordinary refractive index. When the incident angle becomes 90 degrees, the electric field of light becomes perpendicular to the long axis of the molecule, and hence the refractive index of the P-polarized light corresponds to the ordinary refractive index. In a case of an intermediate angle, both the influence of the extraordinary refractive index and the influence of the ordinary refractive index are mixed, with the result that the refractive index has angle dependence.

In other words, the degree of absorption of the polarizer layer including the dichroic molecules with the absorption axis substantially parallel to the long axis of the molecule strongly depends on the incident angle. The absorption is strongest in the case of vertical incidence. This fact indicates that, as the incident angle becomes larger, less absorption occurs. As a result, the degree of polarization significantly degrades.

In contrast to this, the dichroic molecules included in the polarizer layer which is negative uniaxial have the absorption axis in a molecular ordinary refractive index direction and thus do not exhibit angle dependence. Therefore, a substantially constant degree of polarization can be obtained without depending on the incident angle.

According to a feature of the dichroic molecules included in the polarizer layer which is negative uniaxial, a structure which is flat and has only a two-fold rotation axis about the long axis of the molecule is taken in many cases. According to such a structure, molecular polarizability values in three directions, that is, x-, y-, and z-directions are different from one another and two ordinary refractive index values are taken. Therefore, an electron cloud is distorted in two directions. This causes a slight reduction in absolute value of absorption, and hence the degree of polarization of the polarizer layer which is negative uniaxial is inferior to the degree of polarization of the polarizer layer which is positive uniaxial in the case of vertical incidence.

That is, there are the following features. The degree of polarization of the polarizer layer which is positive uniaxial in the case of vertical incidence is very high. However, when the incident angle is large, the polarizer layer which is positive uniaxial hardly causes polarization. The polarizer layer which is negative uniaxial has the substantially constant degree of polarization without depending on the incident angle. However, an absolute value of the degree of polarization is not very high.

According to the present invention, the polarizer film in which light having a small incident angle, such as vertically incident light, is polarized by the polarizer layer which is positive uniaxial and light having a large incident angle is polarized by the polarizer layer which is negative uniaxial is used to suppress the dependence of the degree of polarization on viewing angle. Therefore, a liquid crystal display apparatus in which viewing angle characteristics with respect to a contrast ratio are improved is realized.

Specifically, the polarizer layer which is positive uniaxial is an iodine stretched polarizer which is normally widely used. The polarizer is produced by stretching polyvinyl alcohol polymers while the polyvinyl alcohol polymers are dyed with iodine molecules so that the main chain of polyvinyl alcohol is aligned in one direction and the iodine molecules are aligned in one direction. In the produced polarizer, rather than the point that iodine is dichroic, it is considered that an electric filed of light parallel to a direction of the main chain of polyvinyl alcohol which is aligned in one direction causes oscillation polarization, and it is transferred to iodine-based dyes and converted into heat to be absorbed. A polarizer using dichroic dyes exhibiting azo-based rod-like molecules is known as a dye-based polarizer, and such a polarizer is also the polarizer layer which is positive uniaxial because the absorption axis is located in the molecular long-axis direction.

In contrast to this, the polarizer layer which is negative uniaxial includes a compound described in PCT Publication WO 97/39380 or a compound obtained by sulfonating indanthrone derivative, dibenzimidazole derivative of perylene tetra carboxylic acid, or naphthalene tetra carboxylic acid derivative. In addition, there is a dye which is known as a chromonic dye and represented by C. I. Direct Blue 67. The above-mentioned substances exhibit a lyotropic liquid crystal phase in a case of an aqueous solution having a dye concentration of approximately 5 weight % to 30 weight %. The material of the polarizer layer which is negative uniaxial is not limited to the above-mentioned substances and other materials may be used. The above-mentioned substances exhibit the lyotropic liquid crystal phase in the case of the aqueous solution having the dye concentration of approximately 5 weight % to 30 weight %, and hence, when coating with any material is performed during the application of shearing stress, dye molecules can be aligned to form the polarizer layer.

A dye film formed by coating with the dichroic dyes exhibiting the lyotropic liquid crystal phase does not necessarily become the polarizer layer which is negative uniaxial. For example, even in the case of the coating method using shearing stress, a disazo dye film may become the polarizer layer which is positive uniaxial. Whether the dye film becomes the polarizer layer which is negative uniaxial or the polarizer layer which is positive uniaxial depends on a dye molecular structure and a dye molecular alignment direction. A material used for the polarizer layer which is negative uniaxial may be, for example, a polymerized dye with a molecular structure which is dichroic in a side chain direction with respect to a main chain and has an extraordinary refractive index smaller than an ordinary refractive index. A photosensitive dye film obtained by irradiation with polarized ultraviolet light may be used. An alignment method using an alignment layer may be used. In the case of the alignment method using the alignment layer, a chromonic liquid crystal phase is not necessarily exhibited.

There is also exemplified self-organization achieved by a command surface. For example, when a layer including optical active molecules (command surface) is formed on a substrate and irradiated with linearly polarized light absorbed by the optical active molecules, the optical active molecules included in the command surface are aligned again so as to have long axes of molecules orthogonal to the polarized axis of the irradiated light. When the command surface is coated with a dye solution, a dye alignment is induced. Alternatively, there is a method of providing dye molecules with an optical-cross-linkage functional group or adding a compound which has a photosensitivity and exhibits the chromonic liquid crystal phase as in the case of the dye, and simultaneously performing alignment control and cross-linkage formation by irradiation with polarized ultraviolet light. Accordingly, a film formation method is not limited.

A structural example for achieving the object described above is the following structure of the liquid crystal display apparatus. An iodine stretched polarizer layer including a protective layer (for example, triacetyl cellulose or poly cycloolefin) and a polarizer layer, which is negative uniaxial (for example, C. I. Direct Blue 67) and includes a protective layer (polymer having negligibly small amount of retardation in each of in-plane and thickness directions), are bonded to each other by a bonding material having no optical anisotropy to obtain a polarizer film. The polarizer film is provided as a lower polarizer (not on observer's side of liquid crystal panel but on rear side thereof) such that the polarizer layer which is negative uniaxial faces a liquid crystal layer side. In this case, the polarizer film may be provided on not only the rear side of liquid crystal panel but also the observer's side thereof. The polarizer layer which is positive uniaxial may be, instead of the iodine stretched polarizer layer, a polarizer layer using dyes.

In another structural example, a polymer having a negligibly small amount of retardation in the thickness direction may be interposed between the polarizer layer which is positive uniaxial and the polarizer layer which is negative uniaxial. Note that the negligibly small amount of retardation or a rarely observed amount of retardation is, for example, a value of measurement precision limit of a measurement device (for example, Axometrics, Inc.) normally used to measure the retardation in the thickness direction. The measurement precision limit corresponds to a value in a case where the reproducibility of measurement values or the repeatability is low (for example, case where repeated measurement values are different from one another by 50% or more). An absolute value thereof may generally be equal to or smaller than several nm.

In another structural example, the respective polarizer layers may be separately formed and bonded to each other. A medium interposed between the polarizer layers desirably has a negligibly small amount of retardation in each of in-plane and thickness directions. It is suitable to provide the polarizer layer which is negative uniaxial on the liquid crystal panel side. When only a single polarizer including a combined polarizer film in which two types of polarizer layers are combined is to be used, the polarizer is desirably provided as a lower polarizer located on the rear side (back light unit side) of the liquid crystal panel. A medium interposed between the combined polarizer film and the liquid crystal panel desirably has no optical anisotropy such as an in-plane retardation. The medium interposed between the combined polarizer film and the liquid crystal panel more desirably has a negligibly small amount of retardation in the thickness direction. Therefore, compensation of viewing angle characteristics can be more effectively achieved.

The combined polarizer film according to the present invention is used to improve the viewing angle characteristics of the polarizer film and is not limited depending on a display mode of the liquid crystal display apparatus. Therefore, the combined polarizer film may be applied to an IPS type liquid crystal display apparatus or a TN type or VA type liquid crystal display apparatus. When a liquid crystal layer has strong viewing angle characteristics, means for compensation of viewing angle characteristics of the liquid crystal layer is desirably provided separately from the combined polarizer film. For example, when the combined polarizer film according to the present invention is used for the liquid crystal panel, an IPS type in which plural electrodes for applying electric fields to the liquid crystal layer are provided on one of a pair of substrates does not necessarily require another means for compensation of viewing angle characteristics. In contrast to this, it is desirable to add the means for compensation of viewing angle characteristics of the liquid crystal layer in the case of a VA type in which the electrodes are provided on both of the pair of substrates and the liquid crystal molecules are aligned perpendicular to the substrates when no voltage is applied.

According to the present invention, the viewing angle characteristics of the polarizer can be improved, that is, the light leakage in the oblique direction during the black state can be reduced. In addition to this, the dependence of contrast ratio on viewing angle can be suppressed.

DETAILED DESCRIPTION OF THE INVENTION

Hereinafter, an embodiment the present invention is described.

[Structure of Combined Polarizer Film]

A polarizer layer of this embodiment is a combined polarizer film which includes a polarizer layer which is positive uniaxial and a polarizer layer which is negative uniaxial. The polarizer layer which is positive uniaxial is a layer including molecules aligned in a direction. In this layer, an extraordinary refractive index in a long-axis direction of molecules causing polarization is larger than an ordinary refractive index and an absorption axis is substantially parallel to a long axis of a molecule. The polarizer layer which is negative uniaxial is a layer including molecules aligned in a direction. In this layer, the ordinary refractive index of molecules causing polarization is larger than the extraordinary refractive index and an absorption axis is substantially parallel to a direction of the ordinary refractive index. A medium (bonding material or protective layer) interposed between the two types of polarizer layers is optically isotropic in both of in-plane and thickness directions.

In a case of vertical incidence, the degree of polarization of the polarizer layer which is positive uniaxial is high. In a case of oblique incidence, particularly, in a case of incidence at a large incident angle equal to or larger than 45 degrees, the degree of polarization of the polarizer layer which is negative uniaxial is high. Therefore, a combination of the polarizer layers is important. Thus, a contrast ratio in a front direction is increased by the polarizer layer which is positive uniaxial and the degree of polarization in an oblique direction is held by the polarizer layer which is negative uniaxial, and hence a high contrast ratio can be maintained. When the incident angle is large, the degree of polarization of the polarizer layer which is positive uniaxial is very small. However, when the incident angle is approximately 45 degrees, a high contrast ratio is obtained because the degree of polarization of the polarizer layer which is positive uniaxial and the degree of polarization of the polarizer layer which is negative uniaxial are added to each other.

Figure 2:
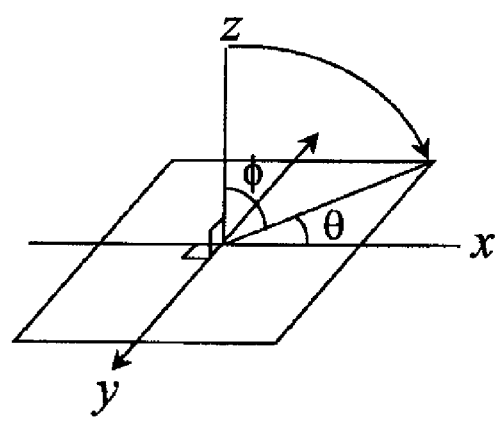
FIG. 2 illustrates definitions of a polar angle, an azimuthal angle, and an absorption axis.

Next, a specific feature of optical characteristics of the combined polarizer film of this embodiment is described. As illustrated in FIG. 2, x-, y-, and z-axes are defined. The absorption axis of the polarizer layer is defined as the y-axis. A polarized axis is defined as the x-axis. A surface of the polarizer layer is defined as an xy-plane. A vertical direction of the xy-plane is defined as the z-axis. That is, the z-axis direction is defined as the front. Assume that $\phi=0°$, where $\phi$ is defined as a polar angle. Assume that an angle from the x-axis on the xy-plane is expressed by $\theta$, where $\theta$ is defined as an azimuthal angle. Vertical incident light is incident light from the z-axis direction)($\phi=0°$ illustrated in FIG. 2. The incidence in the oblique direction is an incidence in each azimuthal angle direction in a case of $0°<\phi<90°$ as illustrated in FIG. 2. The large-angle incidence is an incidence in a case where the angle $\phi$ is large. In this embodiment, a range of the large-angle incidence is assumed to be equal to or larger than 45 degrees.

Figure 3:
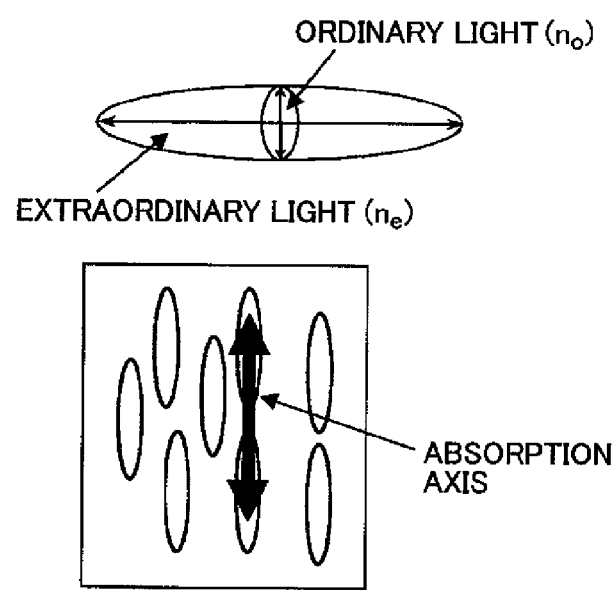
FIG. 3 is a conceptual explanatory view illustrating a polarizer layer which is positive uniaxial.

FIG. 3 is a conceptual explanatory view illustrating the polarizer layer which is positive uniaxial in this embodiment. As illustrated in FIG. 3, molecules causing the degree of polarization have a substantially rod-like shape, and the molecular long-axis direction corresponds to an extraordinary refractive index direction which depends on an angle. The absorption axis appears in an extraordinary axis direction (y-axis direction). The absorption axis is an extraordinary axis having angle dependence, and hence the degree of absorption largely depends on the incident angle, with the result that the degree of polarization depends on the angle.

Figure 4:
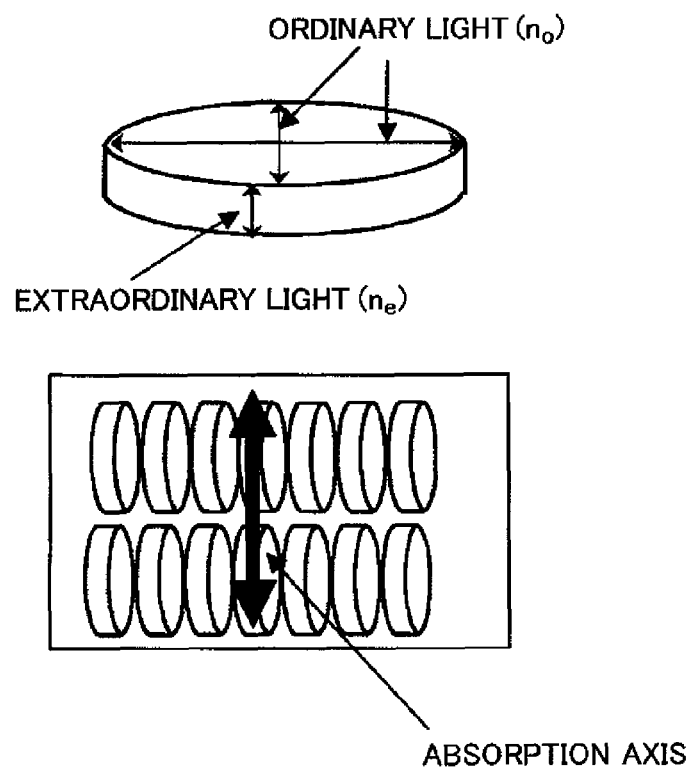
FIG. 4 is a conceptual explanatory view illustrating a polarizer layer which is negative uniaxial.

FIG. 4 is a conceptual explanatory view illustrating the polarizer layer which is negative uniaxial. As illustrated in FIG. 4, molecules causing the degree of polarization have a flattened cylindrical shape, that is, a pellet shape. An in-plane direction of the cylinder corresponds to an ordinary axis and a height direction of the cylinder corresponds to an extraordinary axis. A transition moment of a functional group absorbing light is located in a direction substantially horizontal with respect to an ordinary plane. A polarizer layer aligned so as to cause the ordinary axis to appear in the z-axis direction has absorption axes appearing in the y- and z-axis directions. Therefore, such a polarizer layer substantially constantly causes polarization in only the x-axis direction, and hence the dependence of the degree of polarization on viewing angle is suppressed.

When molecules are uniaxial, refractive indexes in the y- and z-axis directions are equal to each other, and hence an absolute value of the degree of polarization is relatively high. When molecules are biaxial, the respective molecules are not completely aligned in the y- and z-axis directions (because hindered rotation of intramolecular rotation occurs) and the absolute value of the degree of polarization tends to be reduced slightly. Note that the degree of polarization in the case of large-angle incidence can be increased higher than the degree of polarization of the polarizer layer which is positive uniaxial. In a case of chiral molecules or molecules with chiral carbon, the x-axis direction of the respective molecules are twisted and oriented. Even in such a case, the absolute value of the degree of polarization tends to be reduced slightly. However, there is an effect that the dependence of the degree of polarization on angle is suppressed.

The combined polarizer film of this embodiment is obtained by laminating the two types of polarizer layers described above so as to make respective absorption axes parallel to each other. A pressure-sensitive bonding material also called an adhesive is used to bond the two types of polarizer layers to each other. For example, the pressure-sensitive bonding material includes an acrylic resin, a silicone resin, polyester, polyurethane, or polyether as a base resin. The pressure-sensitive bonding material to be selected for use is desirably a material which is excellent in optical transparency, has suitable wettability and cohesive force, and does not cause separation such as floating or peeling under a heating or humidifying condition.

It is desirable to select a material having a heat shrinkage rate which is not significantly different from that of the polarizer layer or a base film supporting the polarizer layer. In a case of an acrylic pressure-sensitive bonding material, a useful base resin is normally an acrylic co-polymer having a weight-average molecular weight equal to or larger than hundred thousand. In the acrylic co-polymer, alkyl ester of acrylic acid having an alkyl group whose number of carbons is equal to or smaller than 20, such as a methyl, ethyl, or butyl group and functional group-containing acrylic monomer including (meta) acrylic acid or (meta) acrylic acid hydroxyethyl are mixed such that a glass-transition temperature is desirably equal to or smaller than 25° C., more desirably equal to or smaller than 0° C.

Next, liquid crystal apparatuses according to examples of the present invention are described with reference to FIGS. 1 and 5 to 10. In each of the examples, at least one polarizer including the combined polarizer film as described above is used.

First Example

Figure 1:
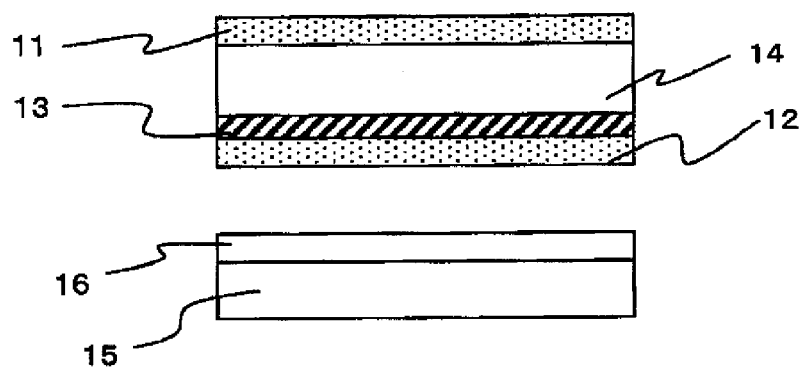
FIG. 1 is an explanatory view illustrating a conceptual structure of a liquid crystal display apparatus according to a first example of the present invention.

A manufactured liquid crystal display apparatus according to a first example of the present invention is described with reference to FIGS. 1 and 5 to 8. FIG. 1 is an explanatory cross sectional view illustrating a conceptual structure of the liquid crystal display apparatus according to this example. As illustrated in FIG. 1, the liquid crystal display apparatus according to the first example includes an iodine stretched polarizer 11, an iodine stretched polarizer layer 12 serving as the polarizer layer which is positive uniaxial, a polarizer layer 13 which is negative uniaxial, a liquid crystal panel 14 interposed between the iodine stretched polarizer 11 and the polarizer layer 13 which is negative uniaxial, a back light unit 15 for supplying light to the liquid crystal panel 14, and an optical sheet (including prism sheet, diffuser, and diffuser films) 16 interposed between the back light unit 15 and the liquid crystal panel 14. Though not illustrated, an adhesive or a protective layer is formed on each of the polarizer layers if necessary.

Figure 5:
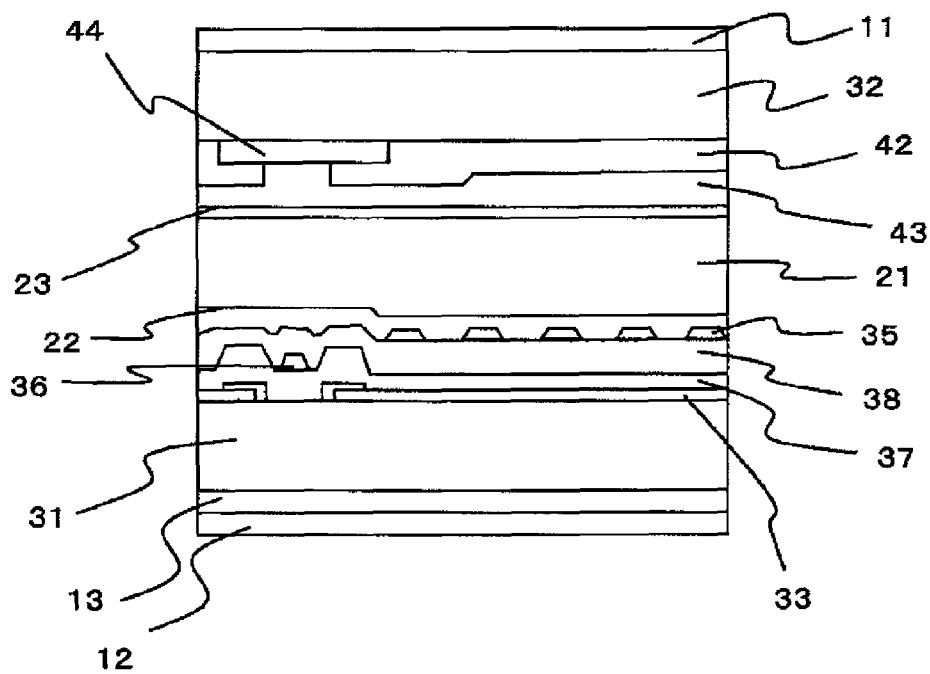
FIG. 5 is a schematic explanatory cross sectional view illustrating a dot and vicinity thereof in the liquid crystal display apparatus according to the first example of the present invention.
Figure 6:
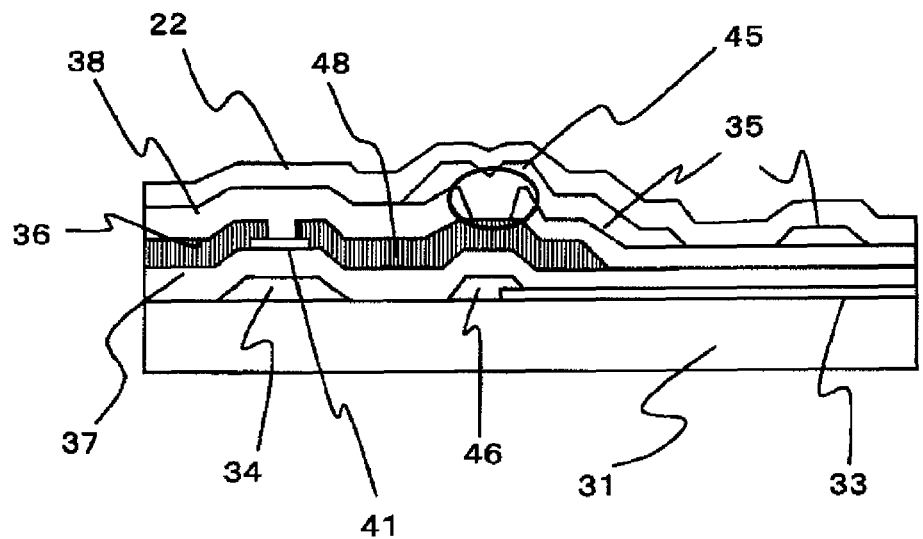
FIG. 6 is a detailed explanatory view illustrating an active matrix substrate side in the schematic cross sectional view of FIG. 5.
Figure 7:
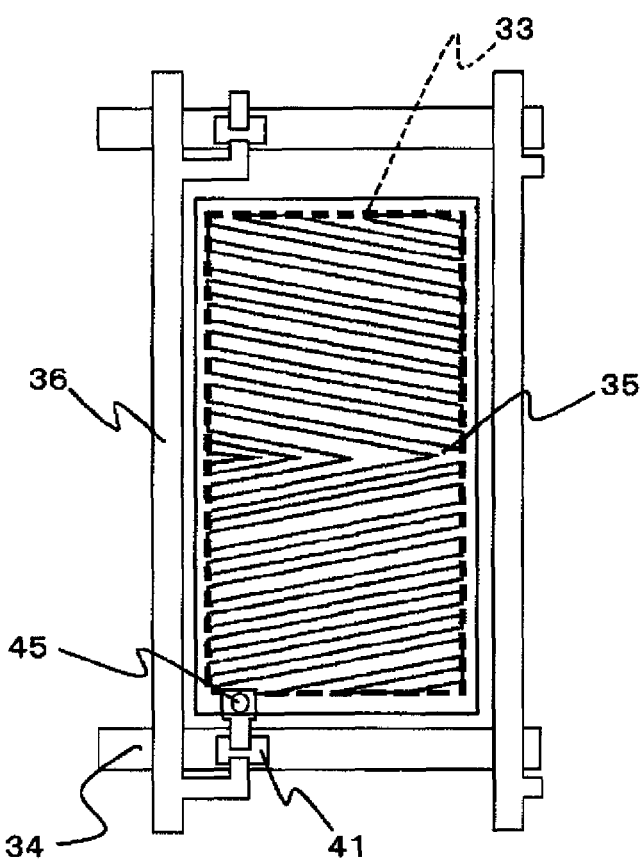
FIG. 7 is a schematic structural explanatory plan view illustrating a dot and vicinity thereof on an active matrix substrate in the liquid crystal display apparatus according to the first example of the present invention.
Figure 8:
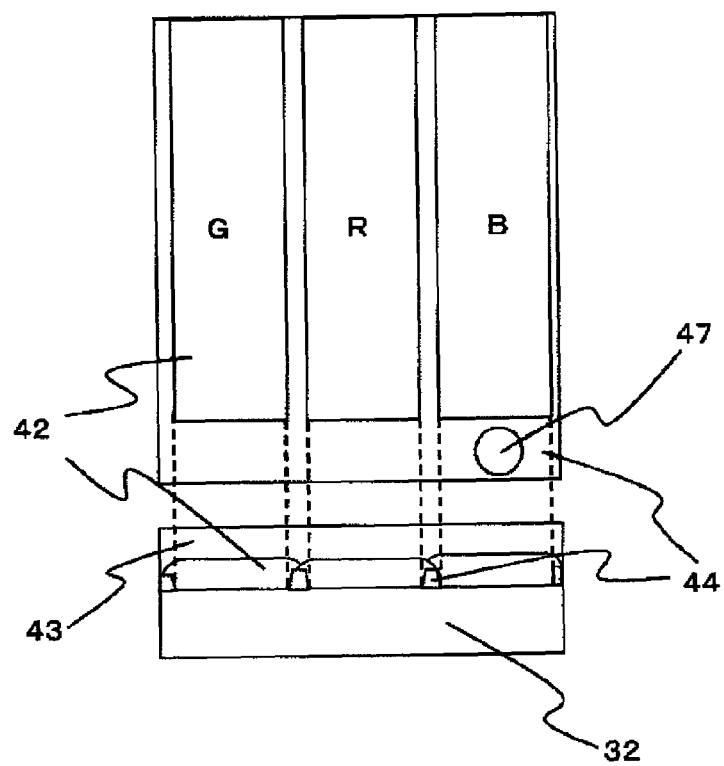
FIG. 8 is a schematic view illustrating a pixel and vicinity thereof on a color filter substrate in the liquid crystal display apparatus according to the first example of the present invention.

FIG. 5 is a schematic explanatory cross sectional view illustrating a dot and vicinity thereof in the liquid crystal display apparatus according to this example, which illustrates a portion of the liquid crystal panel 14 of FIG. 1 in more detail. FIG. 6 is a more detailed view illustrating an active matrix substrate side in the liquid crystal panel 14 of FIG. 5. FIG. 7 is a schematic structural explanatory plan view illustrating a dot and vicinity thereof on an active matrix substrate in the liquid crystal display apparatus according to this example. FIG. 8 is a schematic view illustrating a pixel (having dot structure of three primary colors of red (R), green (G), and blue (B) in this example) and vicinity thereof on a color filter substrate in the liquid crystal display apparatus according to this example.

As illustrated in FIGS. 5, 6, and 7, a common electrode 33 made of indium-tin-oxide (ITO), a scan line (gate electrode) 34 made of molybdenum/aluminum (Mo/Al), and a common electrode line (common line) 46 are provided on a substrate 31 serving as the active matrix substrate. The common electrode line 46 is formed to overlap with the common electrode 33 made of ITO. A gate insulator 37 made of silicon nitride is formed so as to cover the common electrode 33, the gate electrode 34, and the common electrode line 46. A semiconductor film 41 made of amorphous silicon or poly-silicon is provided above the scan line 34 through the gate insulator 37 and serves as an active layer of a thin film transistor (TFT) which is an active element.

A signal electrode (drain electrode) 36 and a pixel electrode (source electrode) line 48 each made of chromium/molybdenum (Cr/Mo) are arranged so as to overlap with part of the patterned semi-conductor film 41. A protective insulator 38 made of silicon nitride is formed so as to cover all those components. With reference to FIG. 6, a through-hole 45 is formed through the protective insulator 38, and a pixel electrode (source electrode) 35 made of ITO is arranged on the protective insulator 38. The pixel electrode 35 is connected to the pixel electrode (source electrode) line 48 made of metal (Cr/Mo) via the through-hole 45.

With reference to FIG. 7, the common electrode 35 made of ITO is formed in a planar manner and the pixel electrode (source electrode) 35 made of ITO is formed in a comb form inclined at an angle of about 8 degrees in a region of one pixel. Note that the substrate 31 is a diagonal 32 inch active matrix substrate having the pixel numbers of WXGA.

Next, as illustrated in FIGS. 5 and 8, a black matrix 44 is formed on a substrate 32 according to a conventional photolithography including the steps of coating, pre-baking, exposure, development, ashing and cleaning, and post-baking with the use of a black resist as a product of Tokyo Ohka Kogyo Co., Ltd. The thickness of the black matrix 44 is set to 1.5 µm in the first example, but may be set as appropriate according to a black resist to be used, so as to have an optical density (OD) of about 3 or more. Next, color filters 42 are formed according to a conventional photolithographic procedure including the steps of coating, pre-baking, exposure, development, ashing and cleaning, and post-baking with the use of 3 color resists.

In the first example, the blue, green, and red color filters have thickness of 3.0 µm, 2.8 µm, and 2.7 µm, respectively, but the thickness can be set as appropriate according to desired color purities or the thickness of the liquid crystal layer. According to the first example, the black matrix 44 is formed so as to surround one dot, but can be formed so as to overlap with the scan line 34 of a TFT substrate, not formed in a region where different colors overlap with each other, and formed so that resists of different colors are adjacently located or overlapped with each other. Next, an overcoat layer 43 is formed using a product of Nippon Steel Chemical Co., Ltd. under the trade name of V-259 so as to smoothen and protect the color filter layers. The overcoat layer 43 is formed by applying i-ray of a high-pressure mercury lamp at an irradiation energy of 200 mJ/cm$^2$ and then heating at 200° C. for thirty minutes. The thickness of the resulting film over a dot is about 1.2 to 1.5 µm.

Next, post spacers 47 are formed to have a height of about 3.9 µm on the black matrix 44 sandwiched between the blue dots by conventional photolithography and etching with the use of a photo-sensitive resin. The position of the post spacers 47 can be freely set according to necessity and is not limited to that of FIG. 8 of this example. Alternatively, spherical ball spacers may be selectively arranged by printing or ink-jetting. Polyamic acid varnish is printed to each of the TFT substrate and the color filter substrate. After that, heat treatment is performed at 210° C. for 30 minutes to form alignment layers 22 and 23, each of which is a dense polyimide film having a thickness of approximately 100 nm. Then, rubbing is performed.

A material of the alignment layers 22 and 23 of the first example is not particularly limited. For example, the material may be a polyimide in which 2,2-bis[4-(p-aminophenoxy) phenyl propane] is used as diamine and pyromellitic dianhydride is used as acid anhydride, or a polyimide in which p-phenylene diamine (PPD) or diaminodiphenylmethane is used as an amine component and aliphatic tetra carboxylic acid anhydride or pyromellitic anhydride is used as an acid anhydride component. In the first example, the alignment layers 22 and 23 are formed by rubbing. However, the present invention is not limited to this. For example, a photosensitive alignment layer material may be irradiated with polarized ultraviolet light to form the alignment layers. An ion beam method using diamond-like carbon may be used. A liquid crystal alignment direction is an extending direction of the scan line 34 illustrated in FIG. 7, that is, a horizontal direction of FIG. 7.

Next, a liquid crystal panel is assembled by arranging the two substrates so that the sides of the substrates carrying the alignment layers 22 and 23 having liquid crystal alignment capability face each other, and coating a sealing agent to peripheries of the substrates. A nematic liquid crystal composition having a dielectric constant anisotropy of +4.0 (1 kHz, 20° C.), and a refractive index anisotropy of 0.09 (wavelength of 590 nm, 25° C.) is filled into the liquid crystal panel. Note that in the first example, a material having a negative dielectric constant anisotropy of liquid crystal can also be used. In this case, the pixel electrode 35 may be formed so that the electric field and the horizontal direction of the pixels form an angle of 45 degrees or more.

The upper polarizer 11 and the lower polarizer (combined polarizer film including polarizer layer 12 which is positive uniaxial and polarizer layer 13 which is negative uniaxial) are bonded to the outside of the liquid crystal panel 14 so as to have polarized axes thereof orthogonal to each other. Then, driving circuits and the back light unit 15 are connected to produce a liquid crystal module, thereby obtaining the liquid crystal display apparatus. The back light unit 15 is of a direct underneath type in which 12 three-band fluorescent lamps are used for a back light. A diffuser and three diffuser sheets are provided as the optical sheet 16 on the back light. The structure of the back light unit 15 is not limited to the first example. Not only the diffuser and the diffuser sheets but also a condenser sheet and a light usage improvement sheet including a polarization conversion layer may be used for the optical sheet 16. The back light used for the back light unit 15 may be a fluorescent lamp, that is, any of a hot cathode fluorescent lamp and a cold cathode fluorescent lamp. A light emitting diode or an organic EL element may be used as the back light. When the back light unit 15 is set to be of not the direct underneath type but a side light type, a light guide plate is desirably used.

In the first example, as illustrated in FIG. 1, the iodine stretched polarizer which is normally used is provided on the upper polarizer 11 located on an observer's side of the liquid crystal panel 14, and the combined polarizer film including the iodine stretched polarizer layer 12 which is positive uniaxial and the polarizer layer 13 which is negative uniaxial is provided on the back light unit 15 side (rear side) of the liquid crystal panel 14. The polarizer layer 13 is formed on a transparent base film made of poly cycloolefin. The polarizer layer 13 which is negative uniaxial is formed as follows. Indanthrone derivative, dibenzimidazole derivative of perylene tetra carboxylic acid, or naphthalene tetra carboxylic acid derivative is sulfonated to provide a lyotropic liquid crystal phase causing a chromonic phase. Coating is performed by shearing stress and drying is performed. After that, ion exchange is performed using an aqueous solution of barium chloride to insolubilize a resultant layer. A film thickness after drying is approximately 150 μm. This obtained layer and the iodine stretched polarizer layer (film obtained by bonding, to triacetyl cellulose (TAC), film obtained by dyeing polyvinyl alcohol polymer with iodine and stretching dyed polyvinyl alcohol polymer) are bonded to each other by an acrylic pressure-sensitive bonding material so as to have absorption axes parallel to each other, thereby forming the combined polarizer film. Poly cycloolefin which hardly exhibits birefringence in both of the in-plane and thickness directions is used for the base film.

The combined polarizer film of the first example is produced by the process described above. However, the combined polarizer film may be produced by other processes. For example, the polarizer layer 13 which is negative uniaxial may be formed as follows. An alignment layer is provided on the base film and the polarizer layer 13 is formed with the use of the alignment regulation force of the alignment layer. Alternatively, coating may be performed to form the polarizer layer 13 while shearing stress is applied onto the alignment layer provided on the base film. Still alternatively, the polarizer layer 13 which is negative uniaxial may be formed by direct coating on the polarizer layer 12 which is positive uniaxial. Further, for example, as in the case of the iodine stretched polarizer which is normally used, a polarizer layer sandwiched by transparent films may be used as the polarizer layer which is positive uniaxial and the polarizer layer which is negative uniaxial may be produced on the transparent film by shearing stress or the alignment regulation force of the alignment layer. In this case, the base film bonded at the side of the combined polarizer film is more desirably a film in which birefringence is hardly measured in both of the in-plane and thickness directions. This is because, when birefringence is induced between the polarizers or between the polarizer and the liquid crystal layer, there is a case where a contrast ratio is reduced.

The polarizer layer which is positive uniaxial may be formed by dyeing with not iodine but dyes and stretching. For the polarizer layer which is negative uniaxial, when a structure having a chromophore which is dichroic as a side chain is employed as in a case of polystyrene or maleimide, the polarizer layer which is negative uniaxial is obtained by stretching.

Next, the contrast ratio of the liquid crystal display apparatus produced in this example is measured. As a result, a contrast ratio in the front direction is 1,200 and a contrast ratio at $\phi=\theta=45°$ is held at 1,100. In a case of $\theta=0°$, even when $\phi=70°$, a contrast ratio is held at 1,000. There is a portion in which a minimum value of contrast ratios in all azimuthal and polar angle directions is 300 at $\theta=45°$ and $\phi>70°$. A value of chromaticity at $\phi=\theta=45°$ during a black state is 0.008 when the value is expressed by a distance $\Delta u'v'$ between two colors based on chromaticity coordinates in the front direction in the definition of a CIE1976u'v'uniform color space. The value is extremely smaller than 0.02 at which a person visually recognizes a change in color.

First Comparative Example

In a first comparative example, a liquid crystal display apparatus in which the polarizer layer 13 of the first example, which is negative uniaxial, is not used is employed. When a minimum value of contrast ratios in all azimuthal and polar angle directions is measured in the liquid crystal display apparatus which does not include the polarizer layer 13, there is a portion in which the contrast ratio is 10 at $\theta=45°$ and $\phi>70°$.

Second Comparative Example

In a second comparative example, a liquid crystal display apparatus in which a viewing angle compensation polarizer including a normal retarder film is used instead of the combined polarizer film of the first example is employed. When a minimum value of contrast ratios in all azimuthal and polar angle directions is measured in the liquid crystal display apparatus using the viewing angle compensation polarizer instead of the combined polarizer film, there is a portion in which the contrast ratio is 120 at $\theta=45°$ and $\phi>70°$, and the contrast ratio is 500 at $\theta=0°$ and $\phi=70°$. With respect to a change in chromaticity at $\phi=\theta=45°$ during the black state, $\Delta u'v'=0.025$, and the change in chromaticity is visually recognized.

Second Example

Figure 9:
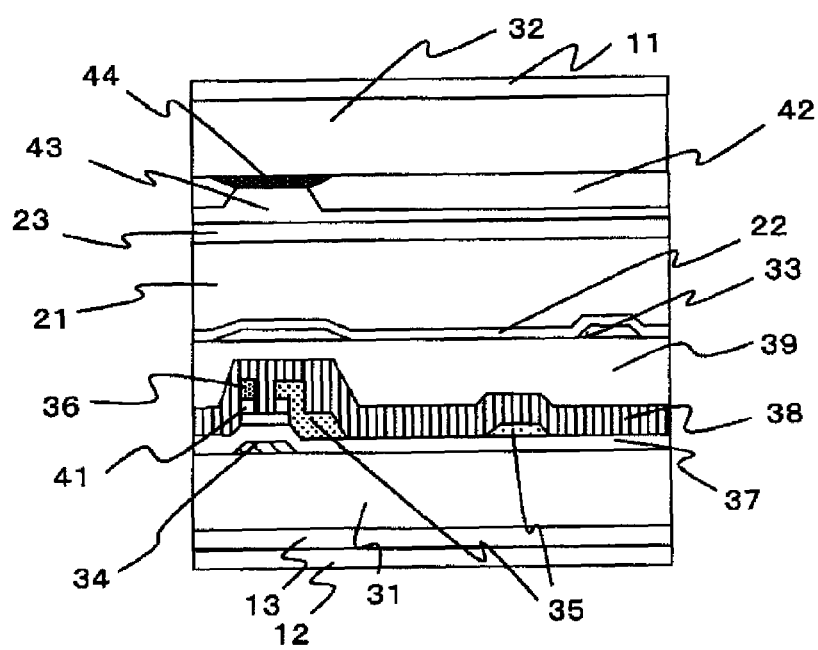
FIG. 9 is a schematic cross sectional view illustrating a dot and vicinity thereof in a liquid crystal display apparatus according to a second example of the present invention.
Figure 10:
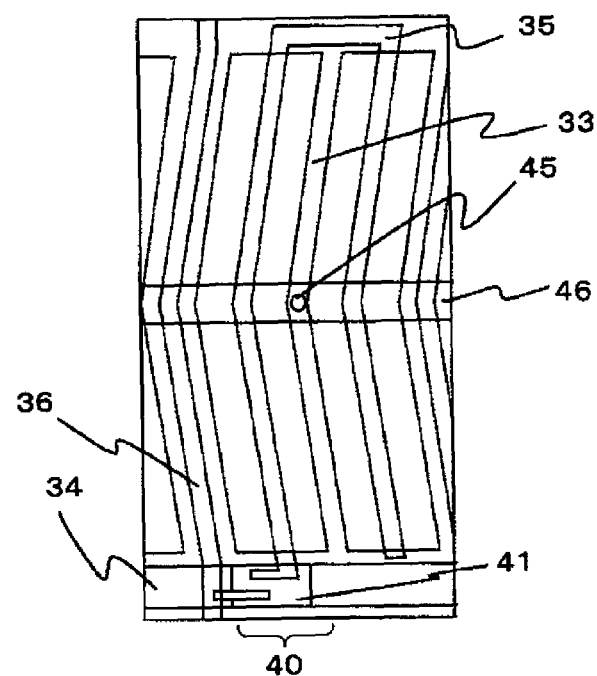
FIG. 10 is a schematic view illustrating a dot and vicinity thereof on an active matrix substrate in the liquid crystal display apparatus according to the second example of the present invention.
Figure 11:
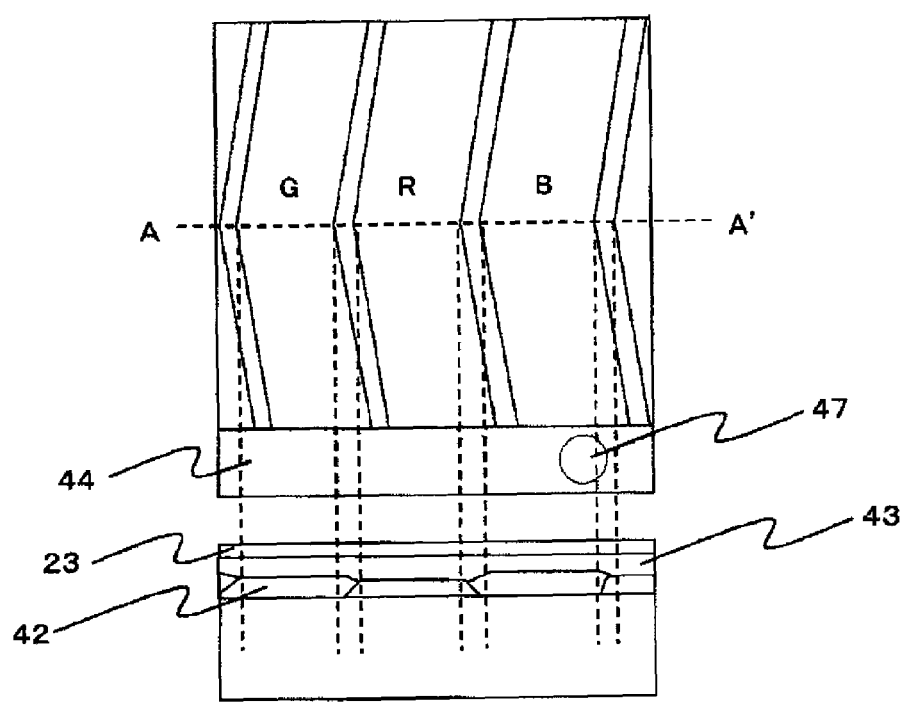
FIG. 11 is a schematic view illustrating a pixel and vicinity thereof on a color filter substrate in the liquid crystal display apparatus according to the second example of the present invention.

A manufactured liquid crystal display apparatus according to a second example of the present invention is described with reference to FIGS. 9 to 11. The liquid crystal display apparatus according to the second example has the same structure as illustrated in FIG. 1 of the first example except for the structure of the liquid crystal panel 14. FIG. 9 is a schematic cross sectional view illustrating a dot and vicinity thereof in the liquid crystal display apparatus according to the second example. FIG. 10 is a schematic structural view illustrating a dot and vicinity thereof on an active matrix substrate in the liquid crystal display apparatus according to the second example. FIG. 11 is a schematic view illustrating a pixel (having dot structure of three primary colors of blue, green, and red in this example) and vicinity thereof on a color filter substrate in the liquid crystal display apparatus according to the second example.

As illustrated in FIG. 9, in the liquid crystal display apparatus of the second example, a non-alkali glass having a thickness of 0.7 mm is used as a substrate 31 constituting an active matrix substrate, and a substrate 32 constituting a color filter substrate. A thin film transistor 40 to be formed on the substrate 31 includes a pixel electrode 35, a signal electrode 36, a scan line 34, and a semi-conductor film 41. The scan line 34 is formed by patterning an aluminum film. A common electrode line 46 and the signal electrode 36 are formed by patterning a chromium film. The pixel electrode 35 is formed by patterning an ITO film. The other components than the scan line 34 are patterned as electrode lines in a staggered manner at an angle of 12 degrees.

The materials for these electrodes are not limited to the above-exemplified materials. For example, any transparent conductive material such as indium-zinc-oxide (IZO) or any inorganic transparent conductive material may be used instead of ITO. Likewise, materials for metal electrodes are not limited. A gate insulator 37 and a protective insulator 38 are made of silicon nitride to have a thickness of 0.3 µm, respectively. Next, a cylindrical through-hole 45 having a diameter of about 10 µm is formed up to the common electrode line 46 by photolithography and etching. An acrylic resin is coated onto the through-hole 45 and is heated at 220° C. for one hour to obtain a transparent and insulative interlayer insulator 39 having a thickness of about 3 µm and a dielectric constant of about 4.

Next, the through-hole is etched again to have a diameter of about 7 µm, and an ITO film is deposited and patterned thereon to form a common electrode 33 to be connected with the common electrode line 46. In this procedure, the distance between the pixel electrode 35 and the common electrode 33 is set to 7 µm. The common electrode 33 is formed to have a thickness of about 80 µm in a grid-like manner so as to cover the signal electrode 36, the scan line 34, and the thin film transistor 40 and to surround pixels. Note that the substrate 31 is a diagonal 32 inch active matrix substrate having the pixel numbers of WXGA. Next, a black matrix 44 is formed on the substrate 32 according to a conventional photolithographic procedure including the steps of coating, pre-baking, exposure, development, ashing and cleaning, and post-baking with the use of a black resist as a product of Tokyo Ohka Kogyo Co., Ltd. The thickness of the black matrix 44 is set to 1.5 µm in this example, but may be set as appropriate according to a black resist to be used, so as to have an OD value of about 3 or more.

Note that a black resist is used in the second example, but a black matrix 44 including a metal layer may also be formed. Next, color filters 42 are formed according to a conventional photolithographic procedure including the steps of coating, pre-baking, exposure, development, ashing and cleaning, and post-baking with the use of each color resist. In the second example, the blue, green, and red color filters have thickness of 3.0 µm, 2.8 µm, and 2.7 µm, respectively, but the thickness can be set as appropriate according to desired color purities or the thickness of the liquid crystal layer. The color filter 42 is formed according to a conventional photolithographic procedure in the second example, but the present invention is not limited thereto. A color filter 42 formed using various processes such as printing, ink-jetting, dry film formation, transferring, and the like may be used.

Next, an overcoat layer 43 is formed using a product of Nippon Steel Chemical Co., Ltd. under the trade name of V-259 so as to smoothen and protect the color filter layer 42. The overcoat layer 43 is formed by applying i-ray of a high-pressure mercury lamp at an irradiation energy of 200 mJ/cm$^2$ for exposure and then heating at 200° C. for thirty minutes. The thickness of the resulting layer over a dot is about 1.2 to 1.5 µm. Next, post spacers 47 are formed to have a height of about 3.7 µm on the black matrix 44 sandwiched between the blue dots by conventional photolithography and etching with the use of a photo-sensitive resin. The position of the post spacers 47 can be freely set according to necessity. Further, spherical ball spacers can be used instead of the post spacers. In such a case, it is preferable that the spherical ball spacers be selectively arranged on the black matrix 44 by printing or ink-jetting. In the second example, the black matrix 44 is formed in a region overlapping with the scan line 34 of a TFT substrate, and formed in spaces between adjacent pixels of different colors so as to allow the adjacent different colors to overlap with each other. However, the black matrix 44 may also be formed in a region in which the adjacent pixels of different colors are formed so as to overlap with each other.

Next, diamine obtained as a monomer component by mixing 4,4'-diaminoazobenzene and 4,4'-diaminobenzophenone at a mole ratio of 6:4 and a polyamic acid varnish including acid anhydride obtained by mixing pyromellitic acid anhydride and 1,2,3,4-cyclobutane tetra carboxylic acid anhydride at a mole ratio of 1:1 are formed by printing on each of the TFT substrate and the color filter substrate. After that, heat treatment is performed at 230° C. for 10 minutes to form alignment layers 22 and 23, each of which is a dense polyimide film having a thickness of approximately 100 nm. The TFT substrate and the color filter substrate are irradiated with ultraviolet light which is linearly polarized light in a substantially perpendicular direction. The material for the alignment layers of the second example is not particularly limited as long as the material can provide liquid crystal alignment capability in a direction orthogonal to a polarization plane by irradiation with ultraviolet light which is linearly polarized.

A high-pressure mercury lamp is used as the back light. Ultraviolet light with in a range of 200 nm to 400 nm is extracted through an interference filter. The ultraviolet light is converted into linearly polarized light having a polarization ratio of approximately 10:1 by a pile polarizer laminated on a quartz substrate, and emitted at 230° C. with an emission energy of approximately 1.2 J/cm$^2$. In the second example, an initial liquid crystal alignment direction, that is, a liquid crystal alignment direction in a case where no voltage is applied is an extending direction of the signal line 36 illustrated in FIG. 10. Therefore, an emitted polarization plane corresponds to a long side of the active matrix substrate, that is, an extending direction of the scan line 34 illustrated in FIG. 10. In the second example, the photosensitive alignment layers are used. The alignment layers may be formed by rubbing.

Next, a liquid crystal panel 14 is assembled by arranging the two substrates so that the sides of the substrates carrying the alignment layers 22 and 23 having liquid crystal alignment capability face each other, and coating a sealing agent to peripheries of the substrates. The filled liquid crystal composition is nematic liquid crystal having a positive dielectric constant anisotropy of 10.2 (1 kHz, 20° C.) and a refractive index anisotropy of 0.075 (wavelength of 590 nm, 20° C.). The upper polarizer 11 and the lower polarizer (combined polarizer film including polarizer layer 12 which is positive uniaxial and polarizer layer 13 which is negative uniaxial) are bonded to the outside of the liquid crystal panel 14 so as to have polarized axes thereof orthogonal to each other. Driving circuits and the back light unit 15 are connected to produce a liquid crystal module, thereby obtaining the liquid crystal display apparatus. The back light unit 15 is of a direct underneath type in which 16 three-band fluorescent lamps are used for the back light.

A diffuser, a condenser film, and a diffuser sheet are provided as the optical sheet 16 on the back light. In the second example, an optical film for compensation of viewing angle characteristics is not used. Even when such an optical film is used for the optical sheet 16, the dye film effect of this example is obtained. (That is, the optical sheet 16 may include the optical film for compensation of viewing angle characteristics.) The structure of the back light unit 15 is not limited to this example. Not only the diffuser sheet but also a condenser sheet or a light usage improvement sheet including a polarization conversion layer may be used for the optical sheet 16. The back light used for the back light unit 15 may be a fluorescent lamp, that is, any of a hot cathode fluorescent lamp and a cold cathode fluorescent lamp. A light emitting diode or an organic EL element may be used as the back light. When the back light unit 15 is set to be of not the direct underneath type but a side light type, a light guide plate is desirably used.

The iodine stretched polarizer which is normally used is bonded as the upper polarizer 11 to an observer's side (front side) of the liquid crystal panel 14. The stretched polarizer using dyes may be used without any problem. The polarizer bonded to the back light unit 15 side (rear side) of the liquid crystal panel is the combined polarizer film. A dye layer is formed as follows on the iodine stretched polarizer layer to produce the polarizer. Indanthrone derivative, dibenzimidazole derivative of perylene tetra carboxylic acid, or perylene tetra carboxylic acid derivative is sulfonated to provide a lyotropic liquid crystal phase causing a chromonic liquid crystal phase. Coating is performed by shearing stress and drying is performed. A film thickness after drying of the dye layer is approximately 180 μm. The dye layer is bonded to the liquid crystal panel 14 by an acrylic pressure-sensitive bonding material.

In the second example, as illustrated in FIG. 9, the iodine stretched polarizer which is normally used is provided as the upper polarizer of the liquid crystal panel 14, and the combined polarizer film including the iodine stretched polarizer layer 12 and the polarizer layer 13 which is negative uniaxial is provided on the rear side (back light unit 15 side) of the liquid crystal panel 14. The polarizer layer 13 is formed on a transparent base film made of poly cycloolefin. The polarizer layer 13 is formed as follows. Indanthrone derivative, dibenzimidazole derivative of perylene tetra carboxylic acid, or naphthalene tetra carboxylic acid derivative is sulfonated to provide a lyotropic liquid crystal phase causing a chromonic phase. Coating is performed by shearing stress and drying is performed. After that, ion exchange is performed using an aqueous solution of barium chloride to insolubilize a resultant layer. The polarizer layer 13 has a thickness of 150 μm after drying. The thus obtained layer and the iodine stretched polarizer layer are bonded to each other by an acrylic pressure-sensitive bonding material so as to have absorption axes parallel to each other, thereby forming the combined polarizer film. Poly cycloolefin which hardly exhibits birefringence in both of the in-plane and thickness directions is used for the base film.

Next, the contrast ratio of the liquid crystal display apparatus produced in this example is measured. As a result, a contrast ratio in the front direction is 800 and a contrast ratio at $\phi=\theta=45°$ is held at 750. In a case of $\theta=0°$, even when $\phi=70°$, a contrast ratio is held at 170. There is a portion in which a minimum value of contrast ratios in all azimuthal and polar angle directions is 80 at $\theta=45°$ and $\phi>70°$. A value of chromaticity at $\phi=\theta=45°$ during a black state is 0.007 when the value is expressed by the distance $\Delta u'v'$ between two colors based on chromaticity coordinates in the front direction in the definition of a CIE1976u'v' uniform color space. The value is extremely smaller than 0.02 at which a person visually recognizes a change in color.

Third Example

A manufactured liquid crystal display apparatus according to a third example of the present invention is described with reference to FIG. 12 which is a schematic cross sectional view illustrating a pixel and vicinity thereof in the liquid crystal display apparatus. The third example is different from the first example and the second example which relate to the lateral electric field mode (IPS) liquid crystal display apparatus in that the liquid crystal display apparatus is of a vertical alignment mode (PVA) and two combined polarizer films are used for the upper polarizer and the lower polarizer.

Figure 12:
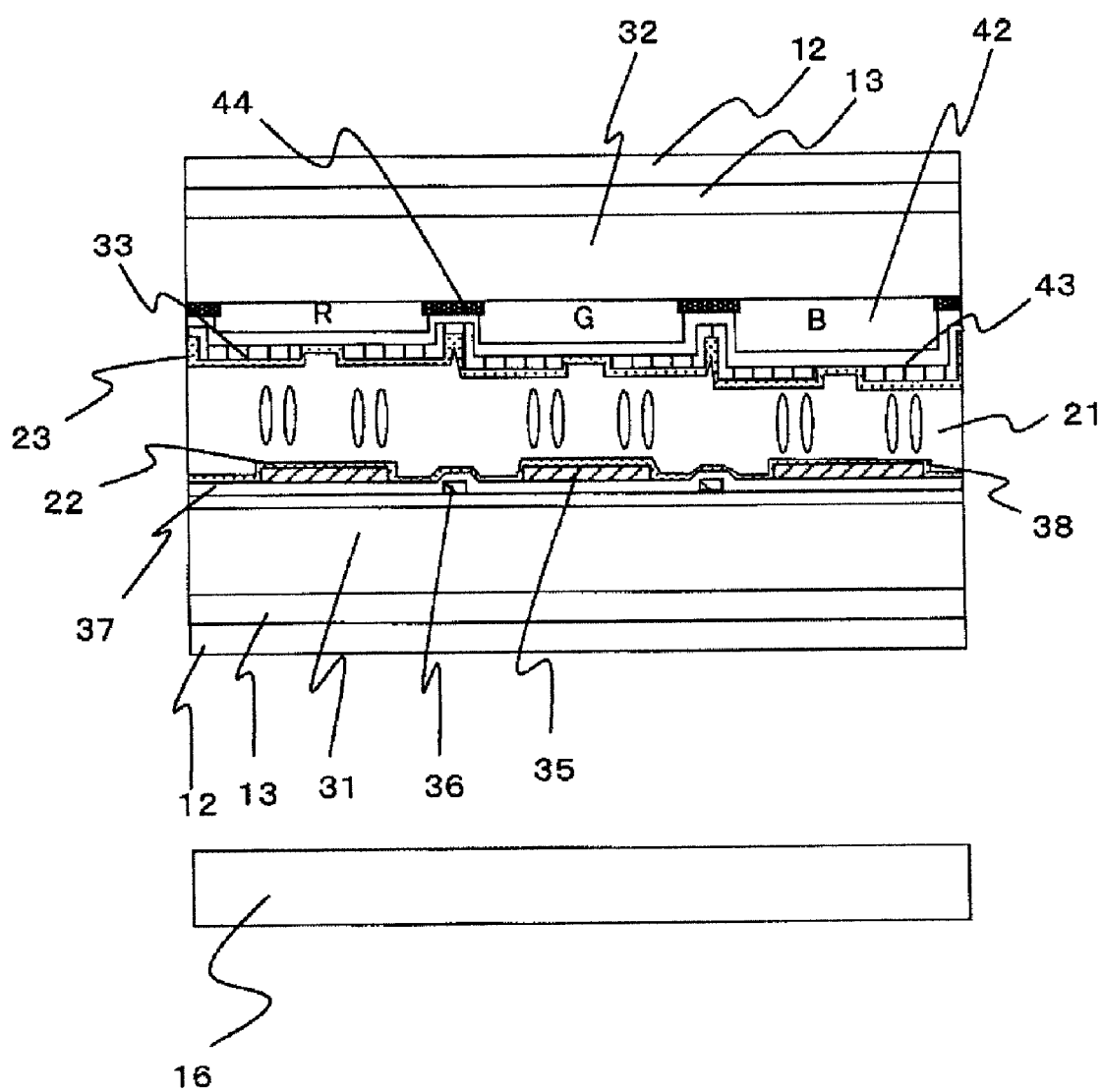
FIG. 12 is a schematic cross sectional view illustrating a pixel and vicinity thereof in a liquid crystal display apparatus according to a third example of the present invention.

As illustrated in FIG. 12, on a substrate 32 which has a thickness of 0.7 mm and corresponds to a color filter substrate, a black matrix 44 is formed by performing continuous sputtering to form a chromium film to have a thickness of 160 nm and a chromium oxide film to have a thickness of 40 nm and by carrying out the steps of coating a positive resist, pre-baking, exposure, development, etching, stripping, and cleaning. Next, color filters 42 are formed according to a conventional photolithographic procedure including the steps of coating, pre-baking, exposure, development, asking and cleaning, and post-baking with the use of three color resists. In the third example, the blue, green, and red color filters have thickness of 3.2 μm, 2.7 μm, and 2.4 μm, respectively, but the thickness can be set as appropriate according to desired color purities or the thickness of the liquid crystal layer.

Next, a common electrode 33 is patterned by carrying out vapor deposition of ITO by sputtering to have a thickness of 140 nm, crystallizing the film by heating at 240° C. for ninety minutes, and carrying out photolithography and etching. The common electrode 33 has openings which are arranged so as to face each other with an opening of the pixel electrode 35 being at the center therebetween and to sandwich the liquid crystal. Next, post spacers are formed to have a height of about 3.5 μm on the black matrix sandwiched between the blue dots by conventional photolithography and etching with the use of a photo-sensitive resin.

A scan line (gate electrode) 34 (not shown in FIG. 12) including molybdenum/aluminum (Mo/Al) is formed on a substrate 31 having a thickness of 0.7 mm serving as an active matrix substrate. In the same layer, a storage capacitor electrode (not shown) may be formed of chromium or aluminum. A gate insulator 37 is formed so as to cover these components, and a signal electrode (drain electrode) 36 and a thin film transistor (not shown) are formed in the same manner as that of the second example. Further, a protective insulator 38 is formed so as to cover these components, and a pixel electrode 35 having an opening pattern is formed of ITO on the protective insulator 38. A transparent conductive material such as IZO can be used as the pixel electrode 35 instead of ITO. Note that the substrate 31 is a diagonal 32 inch active matrix substrate having the pixel numbers of WXGA.

Vertical alignment layers 22 and 23 are formed on the TFT substrate and the color filter substrate, respectively. A sealing agent is coated to peripheries of the TFT substrate and the color filter substrate, and a nematic liquid crystal having a negative dielectric constant anisotropy is dropped and filled according to a one-drop-fill (ODF) method. Thus, a liquid crystal panel 14 is assembled. The combined polarizer films (each including polarizer layers 12 and 13) serving as the upper polarizer and the lower polarizer are bonded to the liquid crystal panel (substrate) so as to have polarized axes orthogonal to each other. After that, driving circuits and a back light unit 15 are connected to produce a liquid crystal module, thereby obtaining the liquid crystal display apparatus. The polarizer layer 12 which is positive uniaxial is of a normal iodine stretched type. Triacetyl cellulose is used for a negative C-plate to provide a polarizer layer for compensating a viewing angle of the liquid crystal layer. Next, the contrast ratio of the liquid crystal display apparatus produced in this example is measured. As a result, a contrast ratio in the front direction is 1,800 and a contrast ratio at $\phi=\theta=45°$ is held at 800. There is a portion in which a minimum value of contrast ratios in all azimuthal and polar angle directions is 70 at $\theta=45°$ and $\phi>70°$.

A value of chromaticity at $\phi=\theta=45°$ during a black state is 0.006 when the value is expressed by the distance $\Delta u'v'$ between two colors based on chromaticity coordinates in the front direction in the definition of a CIE1976u'v' uniform color space. The value is extremely smaller than 0.02 at which a person visually recognizes a change in color. In the third example, the PVA mode liquid crystal display apparatus having an ITO cut pattern is used. In a case of an MVA type in which protrusions are provided on the color filter substrate, the protrusions are formed after an ITO formation process and before a post spacer formation process.

While there have been described what are at present considered to be certain embodiments of the invention, it is understood that various modifications may be made thereto, and it is intended that the appended claims cover all such modifications as fall within the true spirit and scope of the invention.

The present invention can be applied to all types of liquid crystal display apparatuses.

What is claimed is:

1. A liquid crystal display apparatus, comprising:
   a liquid crystal panel including:
   a pair of substrates;
   a liquid crystal layer sandwiched by the pair of substrates;
   plural electrodes formed on at least one of the pair of substrates, for applying an electric field to the liquid crystal layer; and
   a pair of polarizers provided in respective outsides of the pair of substrates; and
   a back light unit provided in a rear of the liquid crystal panel,
   wherein each of the pair of polarizers includes at least two types of layers which cause polarization, and
   wherein the two types of layers include a first layer provided on a side of the liquid crystal layer and a second layer provided on an opposite side of the liquid crystal layer, the first layer being a polarizer layer which is negative uniaxial, the second layer being a polarizer layer which is positive uniaxial.

2. A liquid crystal display apparatus, comprising:
   a liquid crystal panel including:
   a pair of substrates;
   a liquid crystal layer sandwiched by the pair of substrates;
   plural electrodes formed on at least one of the pair of substrates, for applying an electric field to the liquid crystal layer; and
   a pair of polarizers provided in respective outsides of the pair of substrates; and
   a back light unit provided in a rear of the liquid crystal panel,
   wherein one of the pair of polarizers, which is provided in one of the pair of the substrates which is located between the back light unit and the liquid crystal layer, includes at least two types of layers which cause polarization, and
   wherein the two types of layers include a first layer provided on a side of the liquid crystal layer and a second layer provided on a side of the back light unit, the first layer being a polarizer layer which is negative uniaxial, the second layer being a polarizer layer which is positive uniaxial.

3. A liquid crystal display apparatus according to claim 2, wherein the one of the pair of the polarizers further comprises a layer which is provided between the first layer and the second layer, which is optically substantially isotropic in each of in-plane and thickness directions.

4. A liquid crystal display apparatus according to claim 2, wherein the first layer, dichroic dye molecules in which an extraordinary refractive index is smaller than an ordinary refractive index are aligned in an in-plane direction, and coupled with a molecular absorption axis for absorbing light by a dichroic color functional group of the dichroic dye molecules and a long axis of the dichroic dye molecules at an angle substantially perpendicular, and
wherein the second layer, molecules in which an extraordinary refractive index is larger than an ordinary refractive index in which an electric field of light is vertical are aligned in one direction, and the second layer includes dichroic molecules with the molecular absorption axis substantially parallel to the long axis of the molecules.

5. A liquid crystal display apparatus according to claim 2, wherein the polarizer layer which is negative uniaxial has a degree of polarization with respect to incident light in an oblique direction at 45°, which is higher than a degree of polarization of the polarizer layer which is positive uniaxial, and
wherein the polarizer layer which is positive uniaxial has the degree of polarization to incident light in a front direction, which is higher than the degree of polarization of the polarizer layer which is negative uniaxial.

* * * * *